(12) United States Patent
Sherman et al.

(10) Patent No.: US 7,291,415 B2
(45) Date of Patent: Nov. 6, 2007

(54) SOLID OXIDE FUEL CELL WITH EXTERNAL MANIFOLDS

(75) Inventors: Scott Sherman, Calgary (CA); Zheng Tang, Calgary (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 466 days.

(21) Appl. No.: 10/904,692

(22) Filed: Nov. 23, 2004

(65) Prior Publication Data
US 2006/0110647 A1    May 25, 2006

(51) Int. Cl.
*H01M 2/08* (2006.01)
(52) U.S. Cl. .......................... 429/35; 429/37
(58) Field of Classification Search ............. 429/32, 429/35, 37
See application file for complete search history.

(56) References Cited

U.S. PATENT DOCUMENTS

| | | | |
|---|---|---|---|
| 4,345,009 A | 8/1982 | Fahle et al. | |
| 5,750,281 A | 5/1998 | Washington et al. | |
| 6,461,756 B1 | 10/2002 | Blanchet et al. | |
| 6,790,552 B2 * | 9/2004 | Kobayashi et al. | ........... 429/30 |
| 2002/0022170 A1 | 2/2002 | Franklin et al. | |

FOREIGN PATENT DOCUMENTS

WO    WO 99/57781    11/1999

OTHER PUBLICATIONS

Buchkremer, et al. "Components Manufacturing and Stack Integration of an Anode Supported Planar SOFC System" Article.

* cited by examiner

*Primary Examiner*—Patrick Joseph Ryan
*Assistant Examiner*—Thomas H. Parsons
(74) *Attorney, Agent, or Firm*—Bennett Jones LLP

(57) ABSTRACT

A solid oxide fuel cell stack may include repeating fuel cell units each having a planar fuel cell, an interconnect, a cathode contact layer disposed between sealing strips, and an anode contact layer disposed between sealing strips. The sealing strips have end extensions which overlap with corner extensions on the interconnect. The extensions stack to form vertical columns which enclose the external manifolds, along with a manifold plate.

15 Claims, 6 Drawing Sheets

SOLID OXIDE FUEL CELL WITH EXTERNAL MANIFOLDS

BACKGROUND OF INVENTION

The present invention relates to a solid oxide fuel cell with external manifolds.

Conventional solid oxide fuel cell stacks are formed from stacked interconnect plates, also known as bipolar plates, fuel cells comprising membranes and electrodes, and seals. The interconnects and the fuel cells are typically planar and define air and fuel intake and exhaust openings. When stacked vertically, the openings define the intake and exhaust manifolds. The interconnect plates have internal passages on either side of a central barrier which directs air or fuel from its intake manifold, across the fuel cell electrode and into the exhaust manifold. Typically, the fuel cell is square and the fuel gas flows in a direction perpendicular to the direction of air flow across the cell.

Up to five gasket seals are required on either side of an interconnect: one for each manifold and one to surround the electrode surface of the fuel cell. The seals pose a significant hurdle for efficient fuel cell operation as they must provide adequate gas seals while being somewhat compressible, flexible and tolerant of heat cycling within the fuel cell stack. This combination of interconnects and seals necessitated by the internal manifolds of prior art fuel cells creates numerous difficulties which require expensive and complex solutions.

External manifolds are known but also suffer from disadvantages. A significant problem is that the sealing surfaces on the sides of the stack are irregular due to inherent variances in cell sizes. This irregular surface is difficult to seal against and any seal that is developed is often compromised during any thermocycles due to mismatches in thermal expansion.

A significant disadvantage of many external manifold designs is that they require compression along all 3 of the X, Y and Z axes to seal the stack—compressive load in the vertical Z direction to seal the cells to the flow separators and for electrode contact, as well as compression in the X and Y directions to seal the manifolds to the stack. X-Y compression techniques include band clamps, and bolts with low thermal expansion but these techniques may suffer from material creep over time and eventually fail to hold the manifolds tightly to the stack.

Therefore, there is a need in the art for a fuel cell stack with external manifolds which may mitigate the difficulties of the prior art.

SUMMARY OF INVENTION

The present invention relates to an externally manifolded fuel cell stack wherein each manifold is enclosed by a combination of vertical columns formed from extensions of the horizontal stack components and separate vertical manifold plates.

In one aspect, the invention may comprise a fuel cell stack comprising a plurality of repeating horizontal fuel cell units and an external vertical fuel intake manifold, fuel exhaust manifold, oxidant intake manifold and oxidant exhaust manifold, each fuel cell unit comprising: (a) a fuel cell element comprising a cathode, an electrolyte and anode; (b) a cathode flow field layer comprising a porous cathode contact element and opposing sealing strips having manifold extensions extending beyond the fuel cell element; and (c) an anode flow field layer comprising a porous anode contact element and opposing sealing strips having manifold extensions extending beyond the fuel cell element, wherein the anode sealing strips are substantially perpendicular to the cathode sealing strips, and wherein the anode manifold extensions align vertically with the cathode manifold extensions; (d) a barrier plate comprising four manifold extensions, each of which aligns vertically with the anode manifold extensions and the cathode manifold extensions; wherein the cathode manifold extensions, anode manifold extensions, barrier plate manifold extensions of each fuel cell unit stack vertically to form columns which form vertical sidewalls of the manifolds and further comprising a manifold plate which encloses each of the manifolds by abutting two adjacent columns.

In one embodiment, each manifold plate is planar and bolted to or otherwise affixed to the exterior of the stack in a fluid tight manner. In an alternative embodiment, the anode manifold extensions, cathode manifold extensions and barrier plate manifold extensions define substantially vertical and opposing grooves and each manifold plate comprises vertical edges which fit within opposing grooves in a fluid tight manner. In operation, each manifold is pressurized so that the manifold plate is forced outward, sealing the manifold plate within the grooves.

In another aspect, the invention may comprise a method of forming external manifolds on solid oxide fuel cell stack having four corners, comprising the steps of: (a) forming a vertical column of sealing material and barrier plate extensions along each corner, wherein each layer of sealing material is an extension of an anode or a cathode sealing strip; and (b) enclosing the space between two adjacent columns and the stack with a manifold plate.

The manifold plate is preferably planar. In one embodiment, the method may include the step of bolting or otherwise affixing each manifold plate to the stack. In an alternative embodiment, each pair of adjacent columns define opposing vertical grooves, and the method comprises the step of inserting a manifold plate into the grooves.

In another aspect, the invention may comprise a planar solid oxide fuel cell stack comprising a plurality of vertically repeating fuel cell units comprising flow fields defined by sealing strips and planar barrier plates and vertical external manifolds, wherein each manifold is enclosed by a combination of: (a) two vertical columns each formed from alternating layers of a sealing strip extensions and barrier plate extensions; and (b) a vertically planar manifold plate extending between the two vertical columns Preferably, the manifold plate is square or rectangular and each column defines a substantially vertical groove for receiving a vertical edge of the manifold plate.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

The present invention provides for a planar fuel cell stack with external manifolds. When describing the present invention, all terms not defined herein have their common art-recognized meanings. As used herein, "vertical" or "vertically" shall refer to a direction perpendicular to the planar elements of the fuel cell stack. Accordingly, "horizontal" or "horizontally" shall refer to a direction parallel to the planar elements.

Externally manifolded fuel cell stacks are distinguished from internally manifolded stacks. Internal manifold fuel cell stack designs incorporate holes or discrete openings through the interconnects that form vertical plenums that allow reactant gas distribution to and collection from the unit cells when stacked. Essentially, internal manifolds are entirely enclosed by the vertically stacked elements which form the stack. External manifold fuel cell stacks do not typically have provisions built into the interconnect for gas distribution or collection in the vertical sense. External manifolds are typically attached to the stack once the stack of unit cells are assembled and provide a means to deliver and collect the reactant gases from the unit cells.

The present invention relates to an externally manifolded fuel cell stack wherein each manifold is enclosed by a combination of vertical columns formed from extensions of the horizontal stack components and separate vertical manifold plates. The manifold plates cooperate or interface with the vertical columns to provide gas tight seals.

Figure 1:
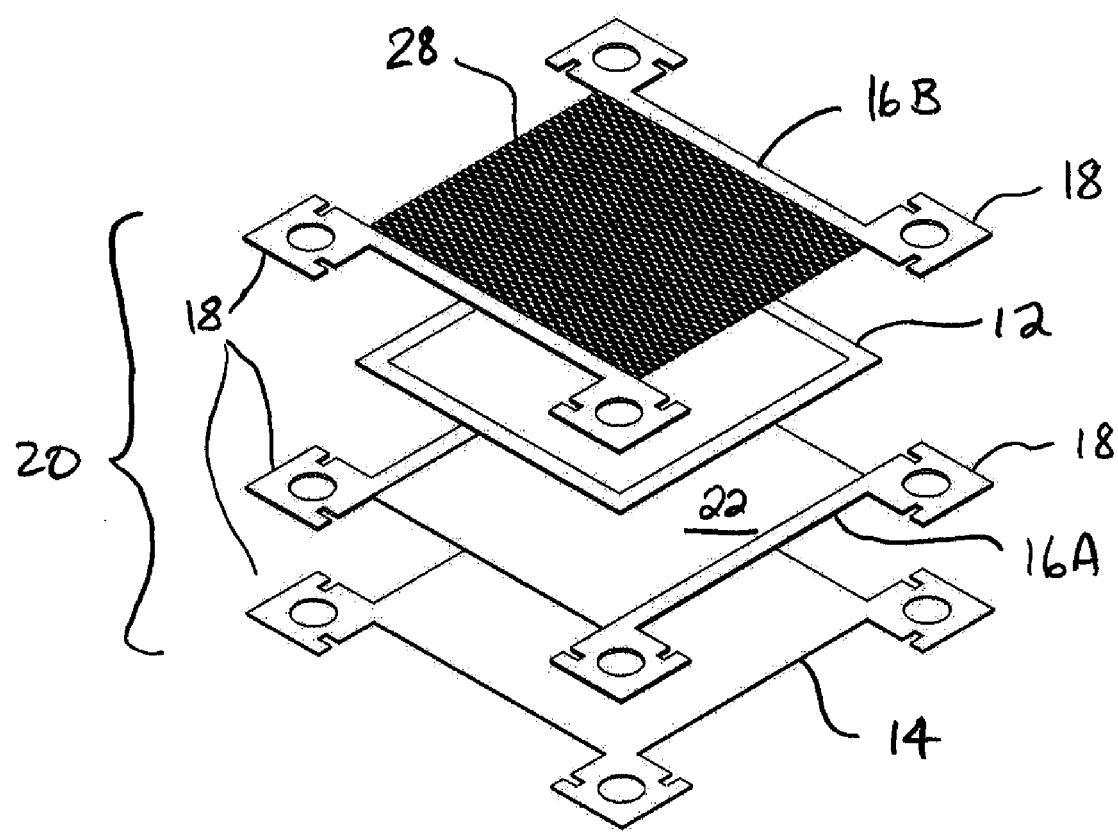
FIG. 1 is an exploded view of one fuel cell unit of the present invention.

As seen in FIG. 1, a fuel cell stack (10) of the present invention comprises a repeating series of fuel cell units comprising a planar fuel cell (12), an interconnect (14) and sealing strips (16A, 16B). The interconnects and sealing strips include horizontal extensions (18) which stack to form vertical columns (20) positioned on each corner of the stack (10). Therefore, the stack of the present invention preferably has a quadrilateral horizontal footprint and more preferably a square footprint. The stack itself comprises four vertical faces which are preferably, but not necessarily, substantially planar. The manifolds surround each stack face to supply and withdraw gas from the stack.

Each fuel cell (12) comprises an anode side and a cathode side. An anode contact layer (22) directly contacts the anode and is positioned between opposing sealing strips (16A) which define an anode flow field between them. Fuel gases which enter the fuel intake manifold (24) flow between the opposing sealing strips, through the porous anode contact layer and exit to the fuel exhaust manifold (26) on the opposite stack face. Similarly, a cathode contact layer (28) directly contacts the cathode and is positioned between opposing sealing strips (16B) which define the cathode flow field. The cathode sealing strips (16B) are positioned at right angles to the anode sealing strips (16A) if the fuel cell (12) is square or rectangular. Air or oxygen from the oxidant intake manifold (29) passes through the porous cathode contact layer (28), between the cathode sealing strips (16B) and passes into the oxidant exhaust manifold (32).

Each corner of the interconnects (14) and each end of each sealing strip ends in an extension (18) which extends beyond the fuel cells (12) and the flow fields. The extensions (18) stack on top of each to form a continuous vertical column (20). Thus, each corner of the stack comprises a vertical column (20) which forms one wall of the manifold on either side of the column.

Each vertical column (20) may define a central opening through which a compression bolt (not shown) may pass. The compression bolt may form part of the means to compress the stack in the vertical dimension.

The sealing strips (16) are preferably flexible and compressible. Suitable sealing strips may include mica or a ceramic material. A preferred seal material may include a ceramic felt or paper which is impregnated with small particles which may be metal, glass or ceramic. A preferred compressible seal material is described in Applicant's co-pending U.S. patent application Ser. No. 09/931,475 filed Aug. 17, 2001 and titled "High Temperature Gas Seals", the contents of which are incorporated herein by reference. Besides retaining gases within the flow fields, the seals serve to electrically insulate the stack and to provide a slip layer between adjacent fuel cell units to accommodate any differences in thermal expansion.

The interconnects (14) may comprise simple planar barrier plates which are electrically conductive to act as current collectors. Alternatively, the area of the interconnect which faces the anode or cathode, as the case may be, may be rippled, corrugated, or otherwise textured, to facilitate or direct gas flow which maintaining electrical contact with the anode or cathode contact layer.

Each of the anode and cathode contact layers are porous and electrically conductive. Suitable contact layer materials are well-known in the art and may include porous ceramic material, metallic foams such as nickel foam, or expanded metals.

Figure 2:
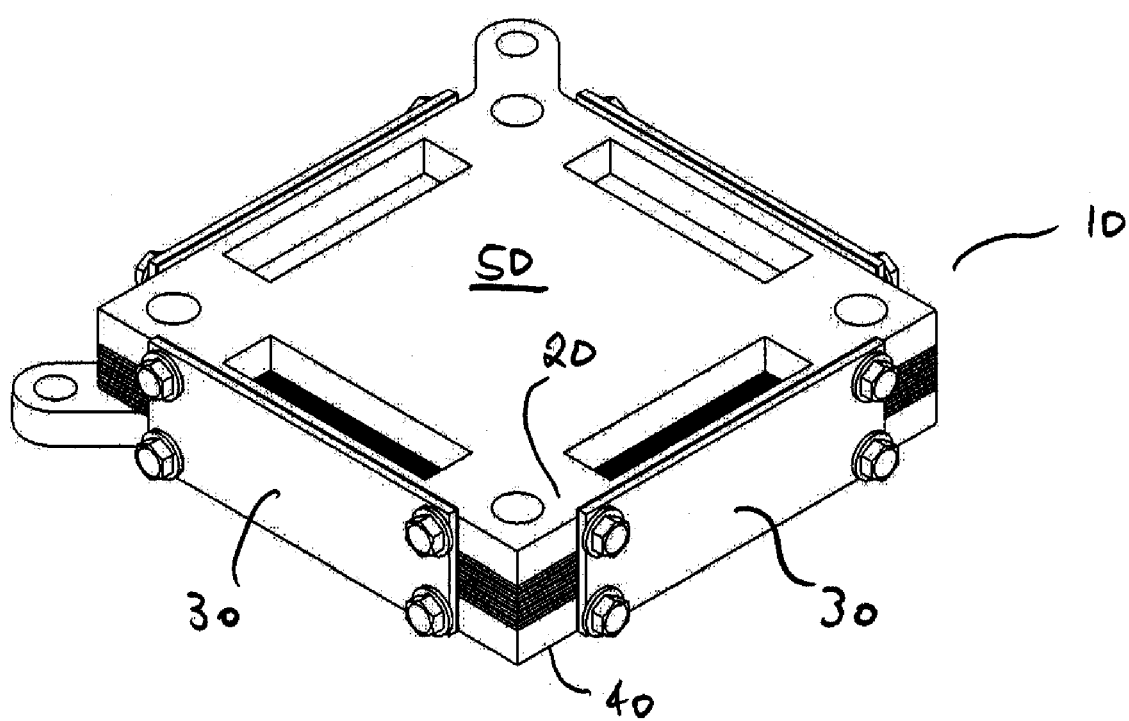
FIG. 2 is perspective view of one embodiment of the present invention, showing the manifold plates bolted to the upper and lower compression plates.
Figure 2A:
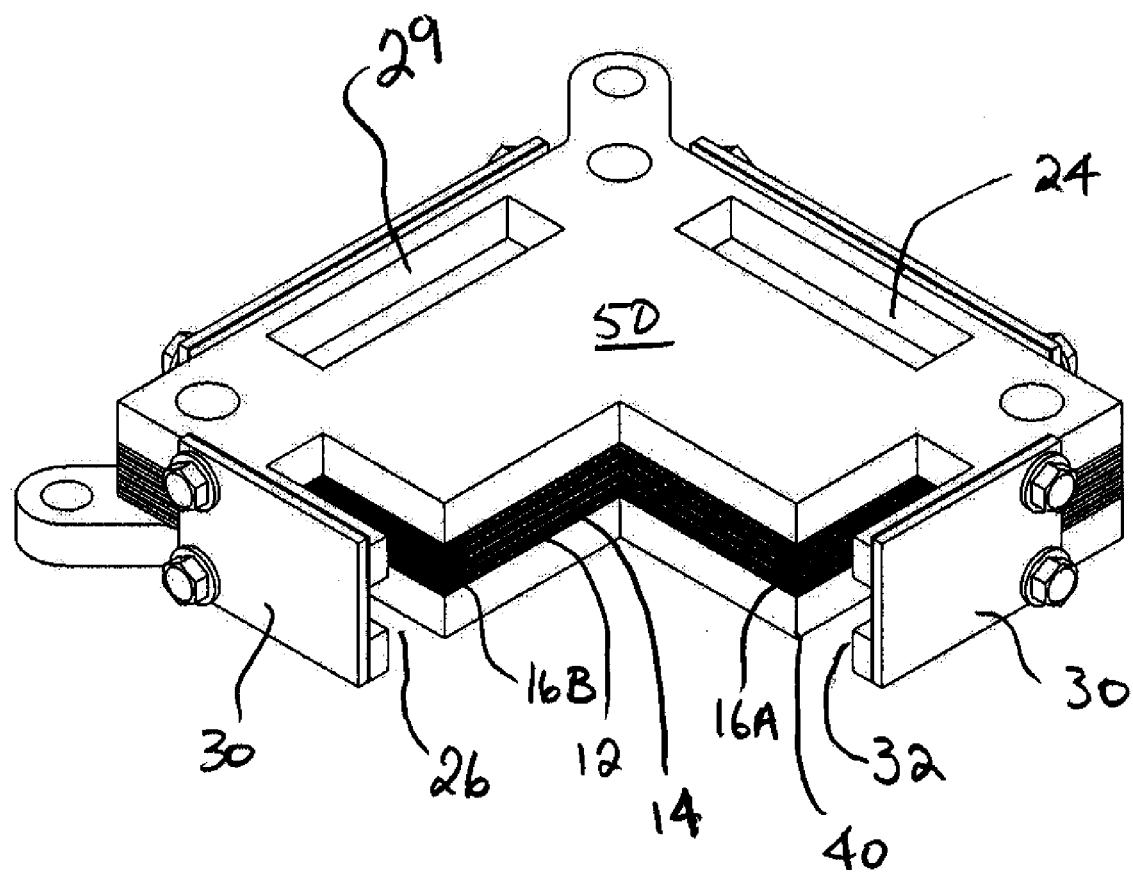
FIG. 2A is a cut-away version of the embodiment shown in FIG. 2.

Each manifold may then be enclosed with vertical manifold plates (30) as shown in FIG. 2. The manifold plates are preferably planar and may be bolted to upper and lower compression plates (40, 50) at the upper and lower ends of the stack. A seal material may be placed at the interface between the manifold plate and the columns.

The attachment of the manifold plates (30) to the upper and lower compression plates may be sufficient to provide a gas-tight seal along the edges of the manifold plate, particularly if a suitable sealing material is provided. However, in an alternative embodiment, outside gas pressure may be used to press the manifold plate against the stack. The stack may be contained within a hotbox (not shown) which is a substantially gas-tight enclosure. The hotbox may be pressurized such that the gas pressure inside the hotbox, which surrounds the stack, is higher than the manifold pressure inside the stack. A pressure differential may be about 5 psi. As a result, the manifold plate (30) will be pressed against the stack (10) by the pressure differential. The attachment bolts may then be used primarily to locate the manifold plate against the stack, rather than provide any substantial compressive force.

Figure 3:
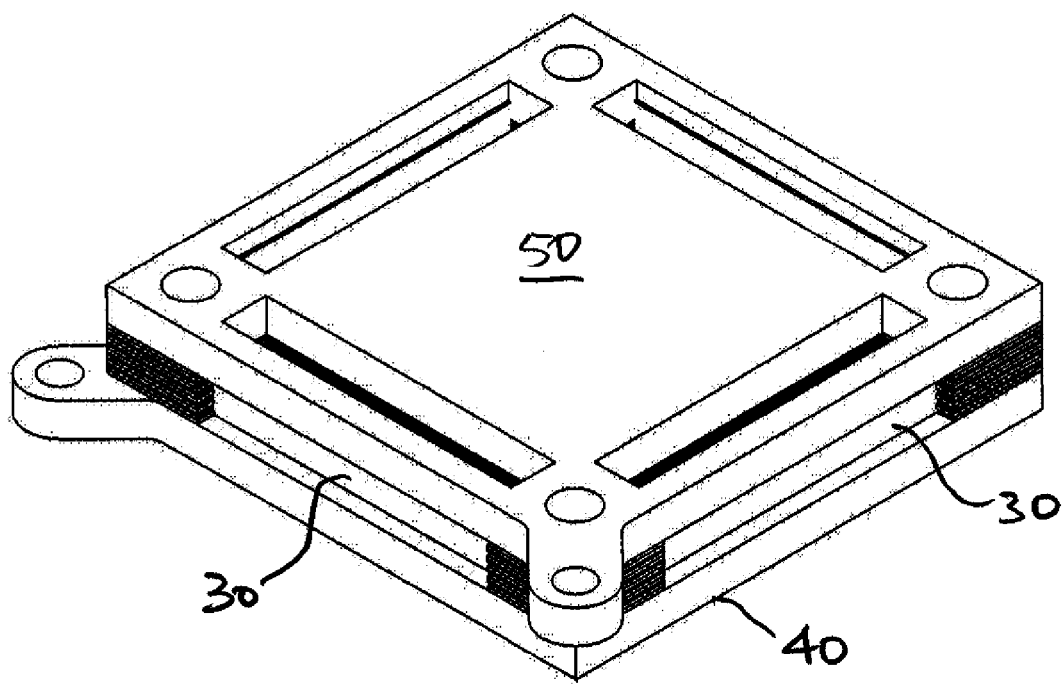
FIG. 3 is a perspective view of an alternative embodiment, showing the manifold plates fit within grooves in the manifold extensions.
Figure 4:
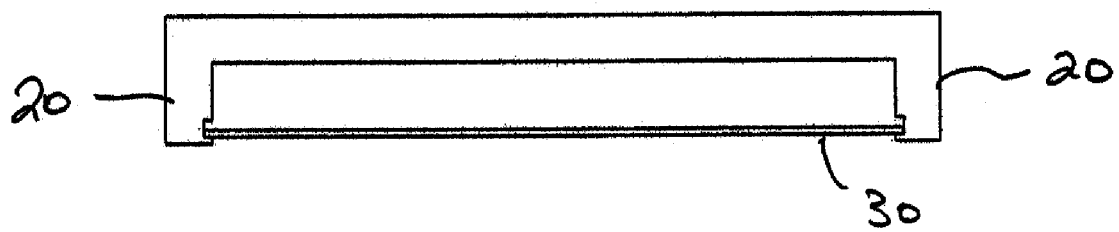
FIG. 4 is a cross-sectional view of one manifold of the embodiment shown in FIG. 3.
Figure 5:
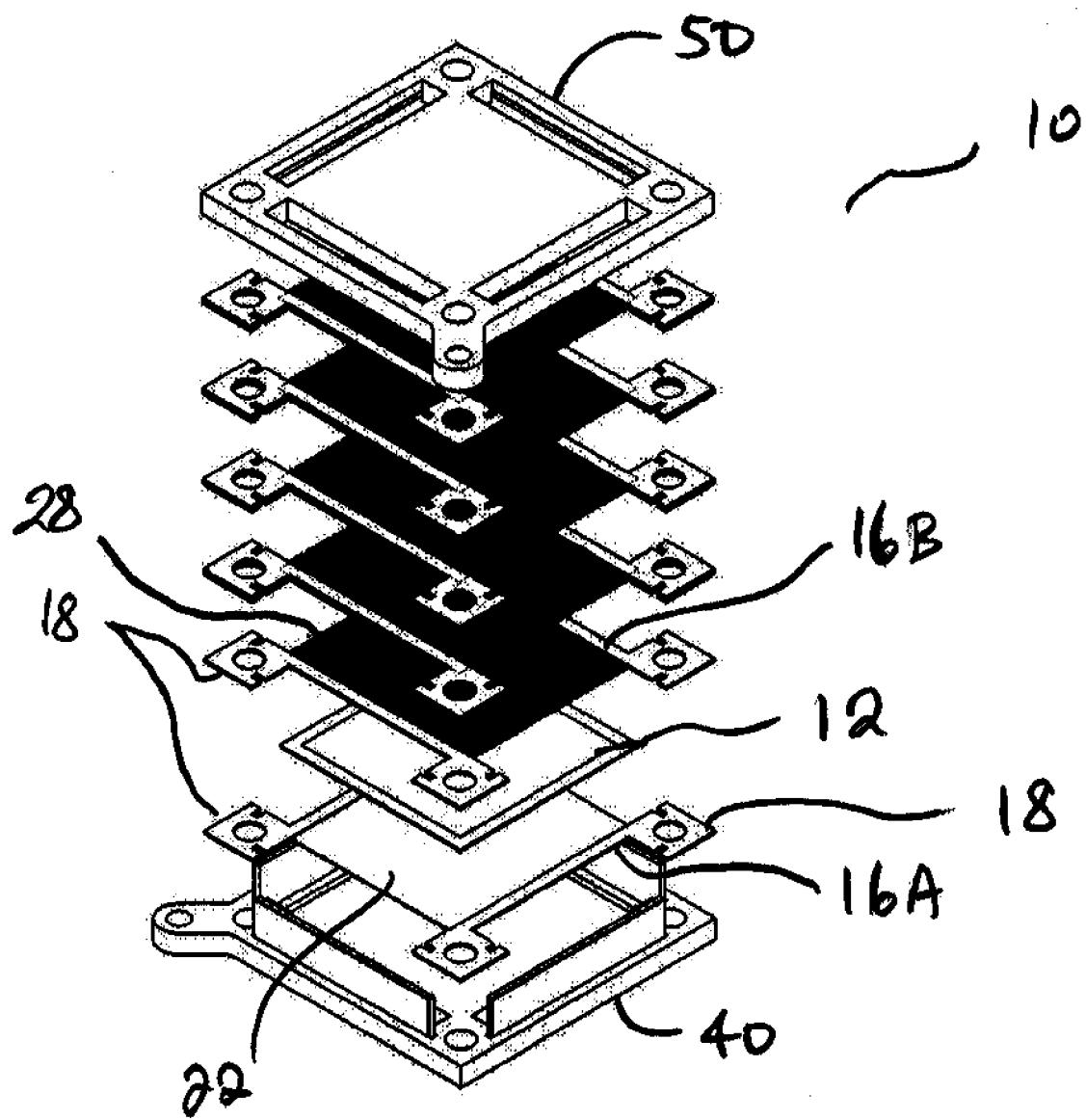
FIG. 5 is an exploded view of an embodiment of a fuel cell stack shown in FIG. 3.

In an alternative embodiment shown in FIGS. 3, 4 and 5, a vertical groove may be formed in each corner column (20) and the manifold plate fit within each groove. Horizontal grooves (not shown) in the top and bottom compression plates retain the top and bottom edges of the manifold plate. In this embodiment, manifold gas pressure assists in sealing the manifold plate (30), eliminating or reducing the need to bolt or otherwise affixing the manifold plate to the stack. In a preferred embodiment, the manifold plate (30) floats within the grooves which retain each edge of the plate. Even a slight pressure differential will seal the manifold plate (30) against the outer shoulder of each vertical and horizontal groove, thereby enclosing the manifold in a fluid tight manner. As used herein, the term "floats" means the manifold plate is not affixed to any of the grooves by any mechanical or adhesive means.

In one embodiment, a thin seal or bedding element (not shown) may be placed within each groove, or along the outer edges of the manifold plate, to help maintain fluid-tight contact between the manifold plate and each groove.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A fuel cell stack comprising a plurality of repeating horizontal fuel cell units and an external vertical fuel intake manifold, fuel exhaust manifold, oxidant intake manifold and oxidant exhaust manifold, each fuel cell unit comprising:
   (a) a fuel cell element comprising a cathode, an electrolyte and anode;
   (b) a cathode flow field layer comprising a porous cathode contact element and opposing sealing strips having manifold extensions extending beyond the fuel cell element; and
   (c) an anode flow field layer comprising a porous anode contact element and opposing sealing strips having manifold extensions extending beyond the fuel cell element, wherein the anode sealing strips are substantially perpendicular to the cathode sealing strips, and wherein the anode manifold extensions align vertically with the cathode manifold extensions;
   (d) a barrier plate comprising four manifold extensions, each of which aligns vertically with the anode manifold extensions and the cathode manifold extensions;
   wherein the cathode manifold extensions, anode manifold extensions, barrier plate manifold extensions of each fuel cell unit stack vertically to form columns which form vertical sidewalls of the manifolds and further comprising a manifold plate which encloses each of the manifolds by abutting two adjacent columns.

2. The fuel cell stack of claim 1 wherein each manifold plate is bolted to or otherwise affixed to the exterior of the stack in a fluid tight manner.

3. The fuel cell stack of claim 2 wherein the manifold plate is held against the stack at least partly by external gas pressure.

4. The fuel cell stack of claim 1 wherein the manifold plate is quadrilateral and planar.

5. The fuel cell stack of claim 4 wherein the anode manifold extensions, cathode manifold extensions and barrier plate manifold extensions define substantially vertical and opposing grooves and further wherein each manifold plate comprises vertical edges which fit within opposing grooves in a fluid tight manner.

6. The fuel cell stack of claim 5 further comprising an upper compression plate and a lower compression plate, wherein the upper compression plate defines a groove for receiving an upper edge of the manifold plate, and the lower compression plate defines a groove for receiving a lower edge of the manifold plate.

7. The fuel cell stack of claim 6 wherein the manifold plate floats within and is retained by each of the four grooves on each of the four edges of the manifold plate.

8. The fuel cell stack of claim 1 wherein each column defines a vertical opening which may receive a compression bolt.

9. A method of forming external manifolds on solid oxide fuel cell stack having four corners, comprising the steps of:
   (a) forming a vertical column of sealing material and barrier plate extensions along each corner, wherein each layer of sealing material is an extension of an anode or a cathode sealing strip; and
   (b) enclosing the space between two adjacent columns and the stack with a manifold plate.

10. The method of claim 9 wherein the stack comprises a lower and an upper compression plate, and further comprising the step of bolting or affixing each manifold plate to the lower and upper compression plates, abutting at least two columns.

11. The method of claim 10 further comprising the step of pressurizing an enclosure surrounding the stack to compress the manifold plate against the stack.

12. The method of claim 9 wherein each column defines two vertical grooves, such that two adjacent columns define opposing grooves, further comprising the step of inserting a manifold plate into opposing grooves to enclose the external manifold.

13. The method of claim 9 wherein the stack comprises an upper compression plate and a lower compression plate, wherein the upper compression plate defines a groove for receiving an upper edge of the manifold plate, and the lower compression plate defines a groove for receiving a lower edge of the manifold plate.

14. A planar solid oxide fuel cell stack comprising a plurality of vertically repeating fuel cell units comprising flow fields defined by sealing strips and planar barrier plates and vertical external manifolds, wherein each manifold is enclosed by a combination of:
   (a) two vertical columns each formed from alternating layers of a sealing strip extensions and barrier plate extensions; and
   (b) a vertically planar manifold plate extending between the two vertical columns.

15. The fuel cell stack of claim 14 wherein each manifold plate is substantially square or rectangular and each column defines a substantially vertical groove for receiving a vertical edge of the manifold plate.

* * * * *